(12) United States Patent
Jameson (10) Patent No.: US 12,449,159 B2
(45) Date of Patent: Oct. 21, 2025

(54) TUNABLE ACOUSTIC METAMATERIALS FOR SOUND DAMPENING OF HVAC EQUIPMENT

(71) Applicant: Trane International Inc., Davidson, NC (US)

(72) Inventor: Richard L. Jameson, Tyler, TX (US)

(73) Assignee: Trane International Inc., Davidson, NC (US)

( * ) Notice: Subject to any disclaimer, the term of this patent is extended or adjusted under 35 U.S.C. 154(b) by 384 days.

(21) Appl. No.: 18/057,585

(22) Filed: Nov. 21, 2022

(65) Prior Publication Data

US 2024/0167724 A1    May 23, 2024

(51) Int. Cl.
| | | |
|---|---|---|
| *F24F 13/24* | (2006.01) | |
| *B32B 3/26* | (2006.01) | |
| *B32B 3/30* | (2006.01) | |
| *B32B 15/08* | (2006.01) | |

(52) U.S. Cl.
CPC .............. *F24F 13/24* (2013.01); *B32B 3/266* (2013.01); *B32B 3/30* (2013.01); *B32B 15/08* (2013.01); *B32B 2307/102* (2013.01); *B32B 2307/732* (2013.01)

(58) Field of Classification Search
CPC ................................. F24F 13/24; B32B 3/266
USPC ......................................................... 165/135
See application file for complete search history.

(56) References Cited

U.S. PATENT DOCUMENTS

| | | |
|---|---|---|
| 3,748,085 A | 7/1973 | Poepsel et al. |
| 4,294,329 A | 10/1981 | Rose et al. |
| 5,013,597 A | 5/1991 | Kracke |
| 5,120,214 A | 6/1992 | West et al. |
| 5,404,934 A | 4/1995 | Carlson et al. |
| 7,086,857 B2 | 8/2006 | Lai et al. |
| 8,770,340 B2 | 7/2014 | Cursetjee |
| 9,305,539 B2 | 4/2016 | Lind et al. |
| 9,390,702 B2 * | 7/2016 | Mathur ................ G10K 11/168 |
| 9,574,791 B2 | 2/2017 | Lind et al. |
| 9,759,447 B1 | 9/2017 | Mathur |

(Continued)

FOREIGN PATENT DOCUMENTS

| | | |
|---|---|---|
| CN | 210052518 U | 2/2020 |
| WO | 2022040693 A2 | 2/2022 |

*Primary Examiner* — Steve S Tanenbaum
(74) *Attorney, Agent, or Firm* — Womble Bond Dickinson (US) LLP (57) ABSTRACT

Example embodiments of the present disclosure relate to improved sound attenuation configurations and methods of manufacturing the same. An example embodiment includes a low noise climate control device. This device may include a housing and a noise producing component within the housing. Further, the device may include an acoustic metamaterial stack arranged in the housing. The acoustic metamaterial stack may include a perforated layer arranged over a spacer layer, and the spacer layer arranged over another perforated layer. Each of the perforated layers may include a plurality of perforations creating a percentage of open area (POA). The perforated layers may further include set(s) of sheets that each including a plurality of openings. These set(s) of sheets may be arranged such that the plurality of openings in the sheets for each perforated layer are coordinate to create the plurality of perforations in each of the perforated layers.

20 Claims, 7 Drawing Sheets

(56) References Cited

U.S. PATENT DOCUMENTS

| | | |
|---|---|---|
| 10,144,854 B2 | 12/2018 | Yoon et al. |
| 10,774,845 B2 | 9/2020 | Mercer et al. |
| 2009/0239429 A1 | 9/2009 | Kipp et al. |
| 2010/0247339 A1 | 9/2010 | Lagemann |
| 2019/0003737 A1 | 1/2019 | Hickey et al. |
| 2019/0108825 A1 | 4/2019 | Acharya et al. |
| 2019/0178493 A1* | 6/2019 | Beakley .................. F24D 5/04 |

* cited by examiner

TUNABLE ACOUSTIC METAMATERIALS FOR SOUND DAMPENING OF HVAC EQUIPMENT

TECHNOLOGICAL FIELD

The present disclosure relates generally to an improved sound attenuation configuration and method for manufacturing the same.

BACKGROUND

Current HVAC systems include multiple noise producing components, which during operation emit sound at various frequencies and magnitudes. Methods exist for attenuating these sounds, and these methods generally fall into one of two categories, active or passive sound attenuation systems, however, problems exist with the current solutions in each of these categories.

Active systems typically reduce sound by introducing destructive acoustical sound waves designed to reduce or eliminate sound at a given frequency or frequency range. These systems typically include costly additional components, and often are only designed to attenuate sound within a narrow frequency range. Moreover, energy is typically required to operate these systems, which reduces the overall efficiency of the HVAC device.

Passive systems use materials that absorb and/or reflect the sound energy, and existing passive systems vary widely in effectiveness. These systems often add thickness or bulk to the overall device, and they tend to be particularly ineffective at reducing sound at low frequencies (e.g., under 1500 Hz). In addition, these existing systems can negatively impact the underlying performance of the device. For example, the materials used in these existing systems absorb sound and convert that energy into heat as a primary sound attenuation method, which impacts the thermal property of a given surface or space.

Some early development has been performed on acoustic metamaterials, which are often directed to attenuating lower frequency noise ranges. However, these materials are often costly and difficult to manufacture. For these reasons (and others), acoustic metamaterials have not been utilized significantly in industry.

BRIEF SUMMARY

Thus, there exists a need for an improved sound attenuation configuration and method for manufacturing the same that address these issues. For example, an improved configuration for acoustic metamaterials that is easier to manufacture, and preferably adjustable would provide a number of benefits for improving the mechanism for attenuating low frequency noise. These improvements may be particularly applicable to the heating, ventilation, and air conditioning ("HVAC") industry.

The examples disclosed herein are directed to sound attenuation configurations and methods of manufacture that address these needs. For example, some implementations of the present disclosure relate to a low noise climate control device and/or a design for lowering the noise produced by the device. These devices may include a housing and contain one or more noise producing components within the housing. An acoustic metamaterial stack may be coupled to the housing, and the acoustic metamaterial may reduce the noise emanating from the noise producing components within the housing.

The acoustic metamaterial stack used in these examples may include multiple layers. For example, these acoustic metamaterial stacks may include a first perforated layer arranged over a spacer layer, and the spacer layer may be arranged over a second perforated layer. The first and second perforated layers may each including a plurality of perforations creating a percentage of open area (POA) in each of the first and second perforated layers.

In some examples, these first and second perforated layers may each further include two or more sheets, where each sheet includes a plurality of openings. The two or more sheets for each perforated layer may be arranged such that the plurality of openings in the two or more sheets for each perforated layer coordinate to create the plurality of perforations in each of the perforated layers.

In some examples, a keying feature is used to arrange the sheets, and correspondingly the openings in the sheets in a desired configuration. Further, some examples include multiple keying features, and each of these keying features may correspond to a different configuration. Still further, some examples, include tuning features which allows the configuration to be adjusted. These features may have various manufacturing advantages as well as other advantages.

The present disclosure thus includes, without limitation, the following example implementations.

Some example implementations provide a low noise climate control device comprising: a housing; a noise producing component within the housing; and an acoustic metamaterial stack arranged in the housing, the acoustic metamaterial stack including a first perforated layer arranged over a spacer layer, the spacer layer arranged over a second perforated layer, and the first and second perforated layers each including a plurality of perforations creating a percentage of open area (POA) in each of the first and second perforated layers, wherein the first and second perforated layers each further include two or more sheets, each sheet including a plurality of openings, wherein the two or more sheets for each perforated layer are arranged such that the plurality of openings in the two or more sheets for each perforated layer coordinate to create the plurality of perforations in each of the perforated layers.

Some example implementations provide method of manufacturing an acoustic metamaterial stack, the method comprising: creating a plurality of openings in a plurality of sheets; coupling a first set of two or more of the plurality of sheets to create a first perforated layer, and coupling a second set of two or more of the plurality of sheets to create a second perforated layer; arranging the first set of two or more of the plurality of sheets such that the plurality of openings in the first set of two or more sheets are coordinated to create a first set of plurality of perforations in the first perforated layer, and arranging the second set of two or more of the plurality of sheets such that the plurality of openings in the second set of two or more sheets are coordinated to create a second set of plurality of perforations in the second perforated layer, wherein the first set of the plurality of perforations create a first percentage of open area (POA) in the first perforated sheet and the second set of the plurality of perforations create a second percentage of open area (POA) in the second perforated sheet; and assembling the acoustic metamaterial stack such that the first perforated layer is arranged over a spacer layer and the spacer layer is arranged over the second perforated layer.

These and other features, aspects, and advantages of the disclosure will be apparent from a reading of the following detailed description together with the accompanying drawings, which are briefly described below. The disclosure includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed disclosure, in any of its various aspects and embodiments, should be viewed as intended to be combinable unless the context clearly dictates otherwise.

BRIEF DESCRIPTION OF THE FIGURE(S)

In order to assist the understanding of aspects of the disclosure, reference will now be made to the appended drawings, which are not necessarily drawn to scale. The drawings are provided by way of example to assist in the understanding of aspects of the disclosure, and should not be construed as limiting the disclosure.

DETAILED DESCRIPTION

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art.

For example, unless specified otherwise or clear from context, references to first, second or the like should not be construed to imply a particular order. A feature described as being above another feature (unless specified otherwise or clear from context) may instead be below, and vice versa; and similarly, features described as being to the left of another feature may instead be to the right, and vice versa. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[a] or [b]" is true if [a] is true, or if [b] is true, or if both [a] and [b] are true. Further, the articles "a" and "an" mean "one or more," unless specified otherwise or clear from context to be directed to a singular form. Like reference numerals refer to like elements throughout.

As used herein, the terms "bottom," "top," "upper," "lower," "upward," "downward," "rightward," "leftward," "interior," "exterior," and/or similar terms are used for ease of explanation and refer generally to the position of certain components or portions of the components of embodiments of the described disclosure in the installed configuration (e.g., in an operational configuration, such as located at a residence or building). It is understood that such terms are not used in any absolute sense.

Some example implementations of the present disclosure relate to a low noise climate control device and/or a design for lowering the noise produced by the device. These devices may include a housing and contain one or more noise producing components within the housing. An acoustic metamaterial stack may be arranged in the housing, and the acoustic metamaterial may reduce the noise emanating from the noise producing components within the housing.

As described more fully below, in some examples, the acoustic metamaterial stack may include multiple layers. These acoustic metamaterial stacks may include a first perforated layer arranged over a spacer layer, and the spacer layer may be arranged over a second perforated layer. The first and second perforated layers used may each include a plurality of perforations creating a percentage of open area (POA) in each of the first and second perforated layers.

In some example, the first and second perforated layers may each further include two or more sheets, where each sheet includes a plurality of openings. The two or more sheets for each perforated layer may be arranged such that the plurality of openings in the two or more sheets for each perforated layer coordinate to create the plurality of perforations in each of the perforated layers.

Figure 1A:
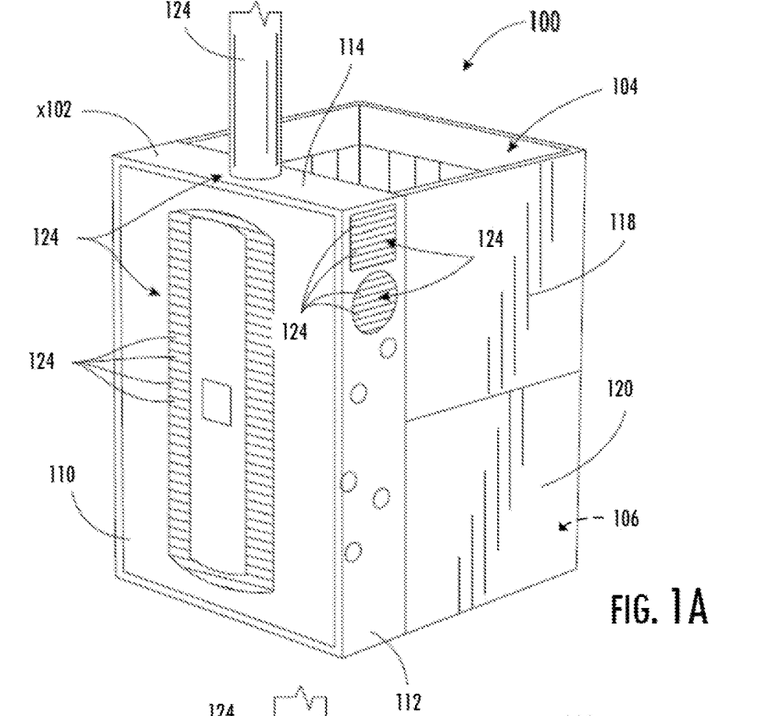
FIG. 1A is an angled view of a furnace, according to an example embodiment of the present disclosure.
Figure 1B:
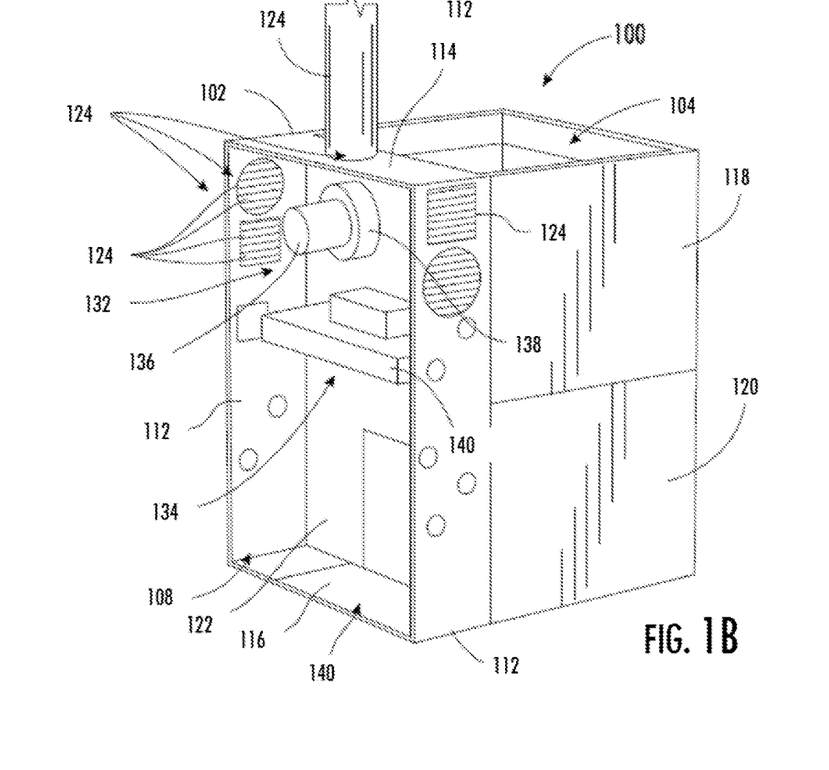
FIG. 1B is another angled view of a furnace with the combustion chamber door removed, according to an example embodiment of the present disclosure.

The examples acoustic metamaterial stacks discussed herein may be used to attenuate sound from any device. In some examples, these stacks may be useful for the heating, ventilation, and air conditioning ("HVAC") industry and/or other fields. In some examples, the acoustic metamaterial stacks are utilized on HVAC equipment, such as a furnace, an air handler, a chiller, a packaged unit, or other climate control device or system. In some examples, the acoustic metamaterial stacks are arranged in or around ductwork to limit the noise associated with air flow. For example, FIGS. 1A and 1B provides an illustration of a furnace that may utilize an acoustic metamaterial stack. For the sake of conciseness, all of the features associated with this furnace are not shown, rather FIGS. 1A and 1B are primarily shown as being representative of a HVAC equipment (or equipment generally) with a housing and noise producing components that may utilize the examples disclosed herein.

The examples depicted in FIGS. 1A and 1B show an angled view of a gas-fired furnace 100 that may utilize the disclosure features. FIG. 1A shows an angled view of a housing 102 for furnace 100. In the depicted example, the housing 102 encloses the heat exchanger chamber 104, the blower chamber 106 (located inside the housing), and the combustion chamber 108. In the depicted example, the housing 102 includes a plurality of panel walls forming the structure or part of the structure associated with the housing. For example, the housing 102 includes a front combustion air wall panel 110, side combustion air wall panels 112, a top combustion air wall panel 114, a bottom combustion air wall panel 116 (shown in FIG. 1B), side heat exchanger wall panels 118, side circulation air wall panels 120 as well as front heat exchanger wall panels and front circulation air wall panels (not shown) located opposite the front combustion air wall panel 110. An additional side heat exchanger wall panel 118 and an additional side circulation blower wall panel 120 are located opposite the side heat exchanger wall panel 118 and the side circulation air wall panel 120 shown in the depicted embodiments. The combustion air chamber 108 also includes a combustion air partition 122 (shown in FIG. 4B) separating the combustion air chamber 108 from the heat exchanger chamber 106 and the circulation air blower chamber 104.

In the depicted examples, the housing 102 also includes housing openings, which may fluidly connect one or more enclosures within the housing to the environment outside the housing. For example, the depicted embodiment includes multiple combustion air chamber openings 124 connecting the combustion air chamber 108 to the environment outside the housing 102. In some embodiments, a conduit or a duct may be coupled to a housing opening, for example, in the depicted embodiment, an exhaust flue 126 is connected to one of the combustion air openings 124.

The embodiment depicted in FIG. 1B shows an angled view of the combustion air chamber 108 with the front combustion air wall panel 110 removed. In the depicted embodiment, the combustion air chamber 108 includes a hollow space 130 that houses various components, including a combustion air blower 132, a burner assembly 134, and various other components. In some embodiments, both the combustion air blower 132 and the burner assembly 134 are noise producing components. In some embodiments, the combustion air blower 132 includes a motor 136 and a blower chamber 138, each of which produces noise. In some embodiments, the components of the burner assembly 134 produce noise, for example, the burners 140 may produce sound as the air/gas mixture ignites and the mixture expands. These various components and others, e.g., the circulation air blower (not shown), air through the heat exchanger (not shown), etc., may produce noise at different frequencies, or some or all of these components may produce noise at the same or similar frequencies. In some embodiments, some or all of these components produce sound within a frequency band that includes 400 Hz to 500 Hz.

The acoustic metamaterial stack may be arranged in the housing 102 depicted in FIGS. 1A and 1B, or any other surface associated with the furnace 100. The acoustic metamaterial stacks may be arranged in and/or coupled to the housing or to any surface in any manner to help attenuate noise from a noise producing compound located within the housing. For example, U.S. application Ser. No. 17/219,639, which is expressly incorporated herein by reference in its entirety, may provide further illustrative configurations for arranging and/or coupling the acoustic metamaterial stack to HVAC equipment or equipment generally.

Figure 2A:
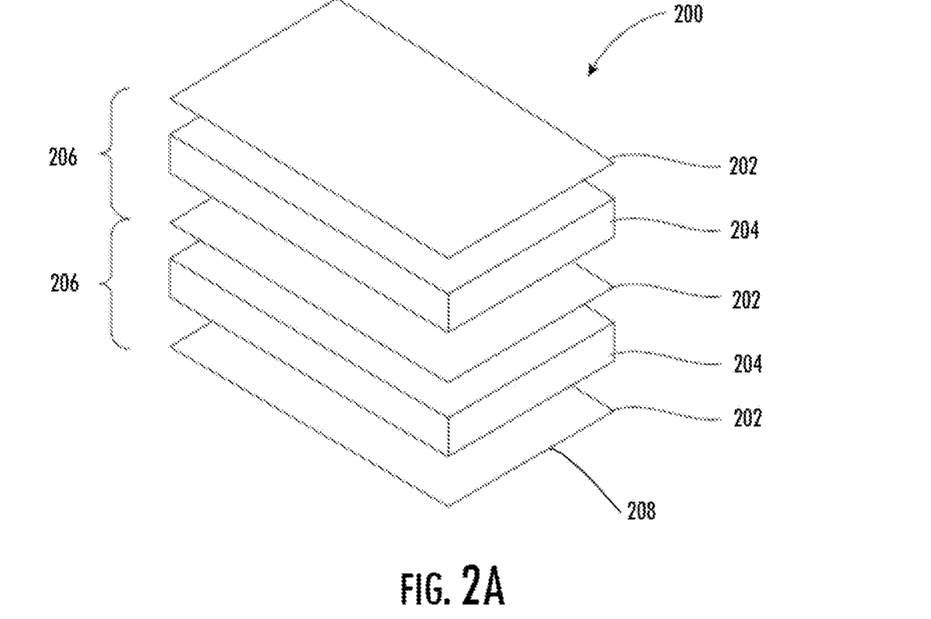
FIG. 2A is an illustration of layers of acoustic metamaterial, according to an example embodiment of the present disclosure.
Figure 2B:
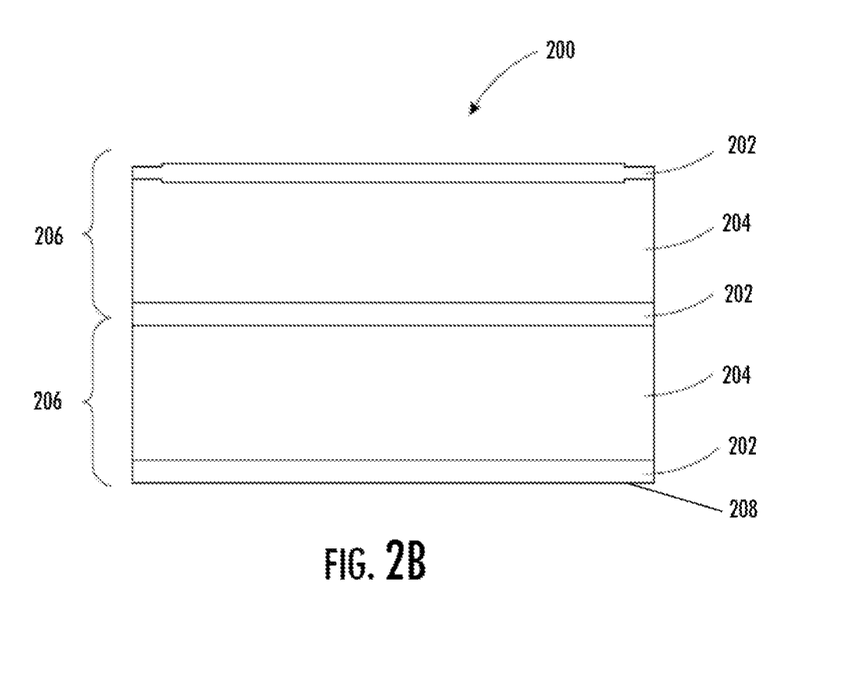
FIG. 2B is another illustration of layers of acoustic metamaterial, according to an example embodiment of the present disclosure.

FIGS. 2A and 2B are shown to illustrate an example structure of acoustic metamaterial stack(s) that may be utilized in some examples disclosed herein. The term acoustic metamaterials as used herein refers to materials containing embedded periodic resonant or non-resonant elements which modify the acoustic properties of the given material. In general, these elements modify the acoustical property by adjusting the dynamics of the sound waves propagating through the material and/or by wave scattering techniques. The example depicted in FIG. 2B shows an example cross-section of acoustic metamaterial 200.

In the depicted example, the acoustic metamaterial comprises alternating hard thin, perforated layers 202 and thicker, spacer layers 204. In the depicted example, the thin, perforated layer 202 comprises a hard material with an acoustical impedance much higher than the surrounding environment (e.g., air in some embodiments). In some examples, this layer comprises a polycarbonate sheet (e.g., DuPont Melinex). In other examples, other forms of plastic sheets or metal sheets may be used. In the depicted example, the perforated layer 202 comprises openings or holes within the layer. The ratio of the open areas created by these holes to the overall size of the layer is sometimes referred to as the percentage of open area ("POA"). In some examples, the POA is less than 5%, or potentially less than 2%. In some examples, the POA is between 0.1%-1.7%, potentially 1.7%. Further, in some examples, the POA of the various perforated layers are different. In some examples, the openings are arranged in a given pattern, which may or may not vary. In some examples, the openings are a specific geometric shape that is consistent across the layer 202, and in some examples these openings vary. In some examples, the perforated layers have a certain maximum thickness. This maximum thickness may be between 0.1 mm and 1.0 mm, potentially 0.50 mm, 0.25 mm, or another value. In these examples, the perforated layers may be less than this maximum thickness even if the perforated layer comprises multiple sheets or materials to form the perforated layer.

In the depicted examples, the thicker layer 204, potentially a spacer layer, may comprise a softer material and may be used, in part, to space the perforated layers 202. In some examples, the thicker layer 204 comprises a fiberglass material (e.g., Micromat). Other materials may be used to form the thicker layer 204, and in some examples, the materials used are porous. In the depicted example, the thicker layer 204 provides a constant spacing between the perforated layers 202, and in some examples, this layer is approximately 0.5 inch and provides that amount of spacing. Other examples may include different dimensions for this layer 204 and/or different spacing. Some examples may not include this layer and may use air or the surrounding medium in the space between the perforated layer 202.

The examples depicted in FIGS. 2A and 2B show an acoustic metamaterial comprising a stacked structure 206. In this example, the stacked structure comprises an outer perforated layer 202 followed by the thicker, spacer layer 204, and then another perforated layer 202, the middle perforated layer 202 in the depicted example. Some examples include a double stacked structure that comprises the first stacked structure, e.g., a first perforated layer arranged over a first thicker spacer layer arranged over a second perforated layer, and this first stacked structure is followed by a second thicker spacer layer arranged over the first stacked structure and a then a third perforated layer arranged over the second thicker spacer layer. The depicted examples in both FIGS. 2A and 2B illustrate a doubled stacked structure. Some embodiments of the present disclosure include more or less acoustic metamaterial layers and/or stacked structures. In some examples, the acoustic metamaterial stack has a maximum thickness, potentially equal to or less than 50.8 mm or 2 inches.

In some examples, the acoustic metamaterial 200 is tuned to attenuate sound over a given frequency range, preferable a lower frequency range (e.g., less than 1500 Hz). This material can be tuned to attenuate sound at a broader or narrower frequency range as well as multiple different frequencies. In some examples, the acoustic metamaterial 200 is tuned to attenuate sound from one or more specific noise producing components. In some examples, these noise producing components are selected due to the frequency of noise a given component produces, potentially independently of the magnitude of noise created. For example, the acoustic metamaterial 200 may be tuned to attenuate sound from a given component because it produces low frequency noise (e.g., a burner assembly, a combustion air blower, etc.), but not another component that produces a greater total amount of noise (e.g., a heat exchanger assembly). In some examples, the acoustic metamaterial is tuned to attenuate sound at a frequency band ranging from approximately 400 Hz to 500 Hz, and in some examples, this frequency band covers the operating frequency of the combustion air blower and the burner assembly. This tuning may be performed in a variety of different ways. For example, in the depicted example, which utilizes a stacked acoustic metamaterial configuration 206, the acoustic metamaterial can be tuned to a given frequency range by adjusting the POA of one or more of the perforated layers 202. Adjusting the size or patterns of the openings on the perforated layer 202 may also impact the tuned frequency band. The spacing between these layers and/or the thickness of the thicker layer 204 may also impact the frequency range. Additionally, the materials used, and their acoustic properties is another factor that can affect the tuned frequency in the depicted example. Other methods for tuning the acoustic material are contemplated within the scope of this disclosure. To the extent another configuration is utilized, such configuration may also be tuned to attenuate sound to reduce sound in a similar manner.

In some examples, the outer layer 208, e.g., the perforated layer 202 on the end of the acoustic metamaterial stack, may be a certain type of material that is designed for the environment adjacent to the acoustic metamaterial stack. As a result, in some examples the outer layer may be a different material from the other perforated layers. For example, the outer layer may be designed to perform sound attenuation associated with the acoustic metamaterial stack while also providing protection to the environment adjacent to the acoustic metamaterial stack from the materials used in the stack. Thus, the outer layer may be made of up a metal sheet while the other perforated layers are made of plastic. This may be used for configurations where the acoustic metamaterial stack is associated with breathable air, e.g., used on a supply or return duct of an air handler. The metal outer layer may help insulate the conditioned air flow from the plastics used in the acoustic metamaterial stack. Other configurations and materials may also be used.

Figure 3A:
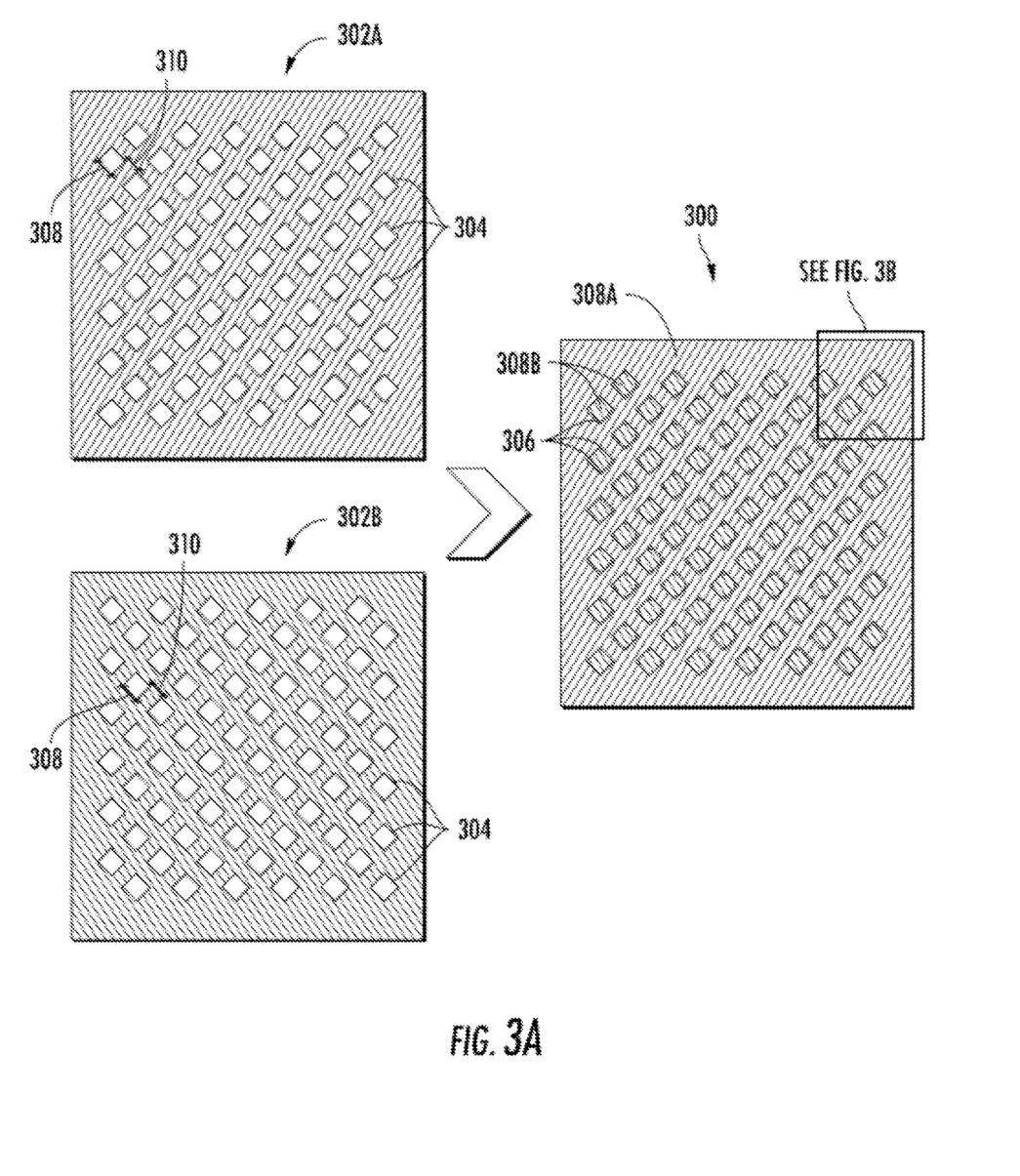
FIG. 3A is an illustration of sheets and a perforated layer, according to an example embodiment of the present disclosure.

In some examples, the perforated layers include two or more sheets. Each of these sheets may include a plurality of openings, and the sheets for each perforated layer may be arranged such that the plurality of openings in the two or more sheets for each perforated layer are coordinated to create the plurality of perforations in each of the perforated layers. FIG. 3A shows an illustration of example sheets 302 that may be used to form the perforated layers 300. In these examples, perforated layers 300 may be the same or substantially similar to perforated layers 202.

In the examples depicted in FIG. 3A, the perforated layers 300 are made up of sheets 302. In these examples, the sheets further include a plurality of openings 304. These sheets for a given perforated layer may be arranged such that the openings for the various sheets create perforations 306 through the given perforated sheet (FIGS. 3B-E shown larger images of these perforations). These perforations may extend through the entire perforated layer to create the POA for that given perforated layer. In contrast, some of the open area associated with the openings in a given sheet may be blocked by an adjacent sheet within the perforated layer. As a result, only some of the open area associated with these openings may contribute to the POA for a given sheet. Said another way, the perforations and POA for a given perforated layer are based on the portion of the openings in the sheets that align with the openings in the other sheets for that given perforated layer. This design may have various advantages, including creating an easier manufacturing technique where larger holes can be manufactured through bulk techniques and the sheets may be arranged to create perforations of a certain size that may be difficult to manufacture. In addition, creating perforations by arranging openings in adjacent sheets may allow more customization and/or adjustments with regarding the POA as well as the size and shape of these perforations. Other advantages may also be realized using this configuration. Further, it is understood that while FIG. 3A only shows two sheets being combined to form a perforated layer, more sheets may also be used according to the examples described herein.

In the example depicted in FIG. 3A, the openings 304 on each sheet 302 are arranged in an opening pattern. Each of the openings have a certain shape, and in the depicted examples, all the openings have a diamond shape. Other shapes (e.g., circles, polygons, etc.) may also be used to generate the range of POA or the density (pattern) of openings that make up the POA. Further, in this example, the opening pattern includes a repeatable pattern of openings. This pattern of openings may be used to allow for perforations to be formed when the sheets are arranged. In some examples, the pattern of openings may be used to create a pattern of perforations. In some examples, the perforated layers may be made up of sheets with the same or similar opening patterns. One of the sheets may have a given opening pattern and the other sheet may have a mirror image of the same opening pattern. This may be done by creating the same opening pattern in multiple sheets and flipping one of the sheets over to create a mirror image opening pattern. Other methods and/or configurations may also be used.

In these examples, the opening pattern may include a shape length and a spacer length. The shape length may be the length of a give distance associated with the shape, and in some examples, the shape length is indicative of the size of the shape. For example, if the openings are square shaped, then the shape length may be the length of one of the sides. Similarly, the spacer length may be a given length associated with the distance between the openings. The spacer length may be the shortest distance between two adjacent openings, and in some examples, the spacer length may be located as on a parallel axis to the opening length. In some examples, there are two or more shape lengths and spacer lengths. For example, if the openings are rectangular shaped, then there may be a first and a second shape length where each length is based on a length of a different side length for the rectangle. In examples where there are two or more shape lengths, then there may also be two or more spacer lengths where the spacer lengths are located parallel to the shape length axis. Again, the spacer length may be the shortest distance between adjacent openings along the axis parallel to the shape length. Further, in some examples, the opening pattern may be designed such that the opening length is greater than the spacer length. This may allow for perforations to be formed with sheets with these opening patterns are joined and the plurality of openings are aligned.

To walk through a further example, reference is again made to FIG. 3A. As shown in this example, the sheets 302 include opening patterns where the openings 304 are diamond shaped. In these examples, the first sheet, 302A, and the second sheet, 302B, include mirror images of the same opening pattern. In these examples, the shape length 308 and spacer length 310 are shown for one of the openings on each sheet. In these depicted examples, the shape length and the spacer length are the same for each of the plurality of openings on both sheets. Further, the shape length in these examples is larger than the spacer length. For example, the shape length may be 5 millimeters (mm) and the spacer length may be 4.25 mm.

As also shown in the example depicted in FIG. 3A, the perforated layers 300 may be formed using the two sheets 302A and 302B. In this example, the first sheet 302A is located on top of the second sheet 302B, and as a result, the second sheet may only be seen through the openings 304 in the first sheet. In these examples, the plurality of openings 304 are arranged to create the plurality of perforations 306.

Figure 3B:
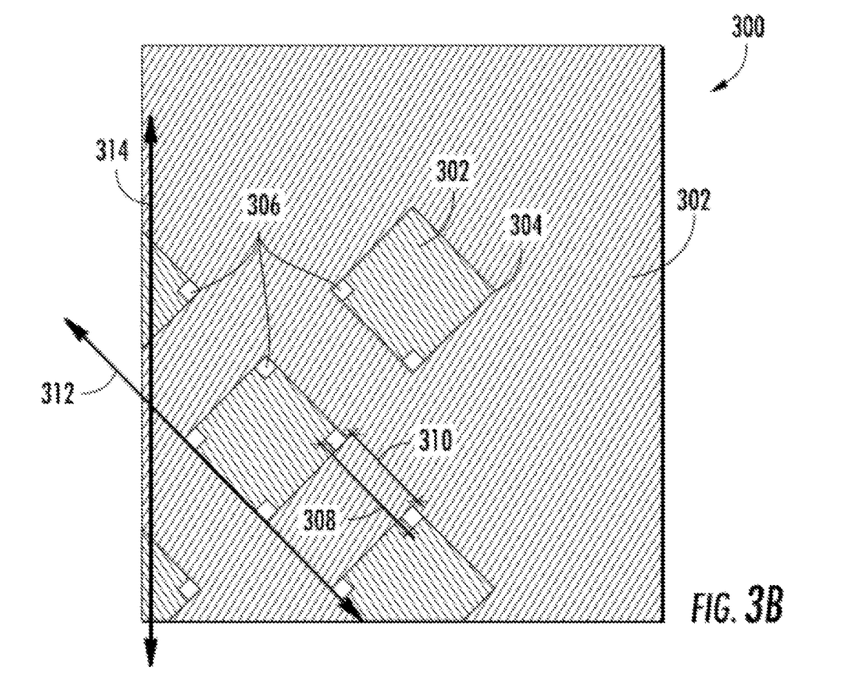
FIG. 3B is an illustration of partial view of a perforated layer, according to an example embodiment of the present disclosure.

Reference is made to FIG. 3B (and FIGS. 3C-E) to illustrate an example of how these openings in different sheets may be aligned to create the plurality of perforations. These figures show an enlarged portion of the perforated sheet 300.

In the example depicted in FIG. 3B, the perforates are created, in part, due to the dimensions of the shape length 308 and the spacer length 310. In this example, because the shape length is longer than the spacer length (which in this example makes the openings larger than the space between the openings) a portion of the openings in each sheet align to create perforations. In the example depicted in FIG. 3B, each opening in a given sheet aligns with four opening in the adjoining sheet. In this example, the sheets 302 are aligned such that the perforations have the same dimensions. Thus, as can be seen in FIG. 3B, each opening in a first sheet is aligned with the corners in four openings in the second sheet, creating four diamond shaped perforations having the same dimensions. In these examples, each diamond shaped perforation may have a length that is one half the difference between the shape length 308 and the spacer length 310. For example, if the shape length is 5 mm and the spacer length is 4.25 mm then the perforation shape length may be 0.375 mm.

Figure 3C:
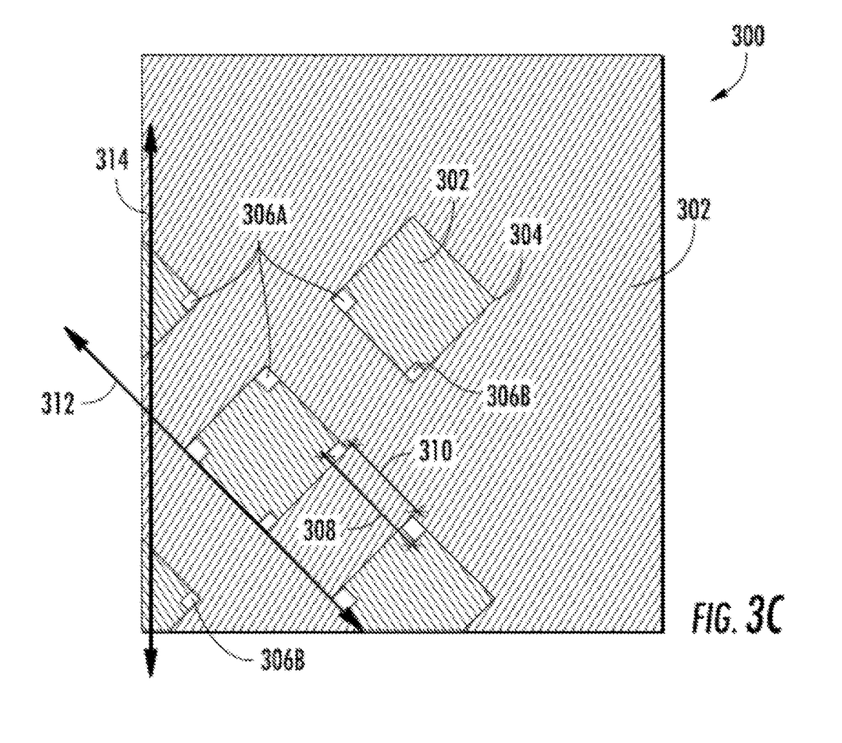
FIG. 3C is an illustration of another partial view of a perforated layer, according to an example embodiment of the present disclosure.
Figure 3D:
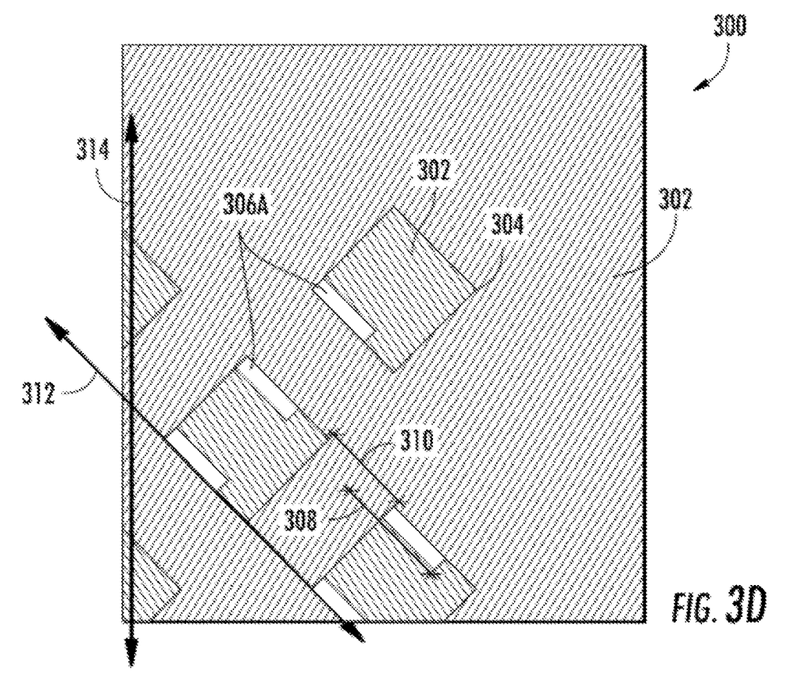
FIG. 3D is an illustration of another partial view of a perforated layer, according to an example embodiment of the present disclosure.
Figure 3E:
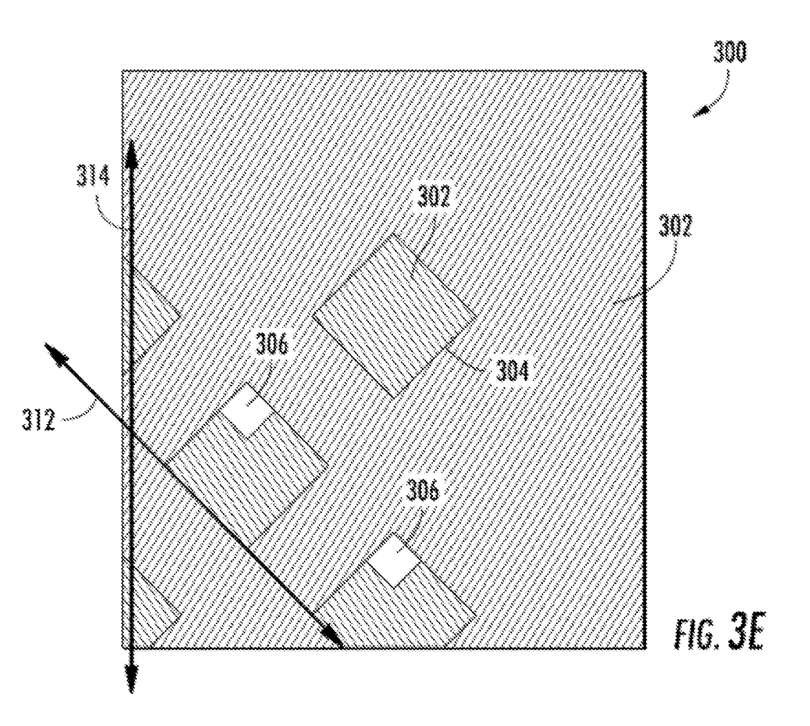
FIG. 3E is an illustration of another partial view of a perforated layer, according to an example embodiment of the present disclosure.

Again, the example depicted in FIG. 3B aligns the openings in each sheet to create a consistent perforation opening and pattern of opening. However, other techniques may also be used to create different perforations and/or percentage of open areas. For example, sliding one of the sheets along the shape length axis 312 may elongate some of the perforations 306A while reducing other perforations 306B as shown in FIG. 3C. In these examples, the perforations 306 may be shaped as rectangles that have been rotated. In these examples, elongated perforations 306A may have a greater open area then the reduced perforations 306B. In these examples, the percentage of open area may be the same in this configuration and only the shape of the perforations have changed. In some examples, the sheets are further shifted as shown in FIG. 3D. In these examples, the elongated perforations 306A are enlarged and there no longer are reduced perforations 306B. In this example, the total POA of the perforated layer is greater than the POA in either depicted example shown in FIG. 3B or 3C. FIG. 3E provides another example of how the sheets may be aligned to create perforations and POA. In this example, the sheets are shifts along the vertical axis 314. As a result, in the depicted example, the perforation shapes remain diamond shaped and the POA for the perforated layer is increased.

The examples depicted in FIGS. 3B-3E are only illustrative of how the openings in the sheets may be used to create (and adjust) the perforations in a given perforated layer. As shown, these adjustments can be made to both perforation shape as well as POA. It is understood, however, that these are examples, and multiple different techniques and arrangements may be utilized to create the desired perforations and POA in a given perforated sheet.

In some examples, the perforated layer(s) include one or more keying features. These keying features may be used to position the two or more sheets in a perforated layer such that the plurality of openings in the two or more sheets create a desired configuration for the plurality of perforations in the perforated layer. For example, the keying feature may be used to align the sheets such that the plurality of openings creates one of the perforation patterns discussed above (or another configuration).

In some examples, a plurality of keying features may be used. In these examples, each of the keying features may selectively position the two or more sheets such that the plurality of openings in the two or more sheets create a different desired configuration for the plurality of perforations.

In some examples, the keying features may be designed to correspond to potential noise producing components. For example, a common perforated sheet may be manufactured to attenuate sound from multiple different potential noise producing components. These noise producing components may produce undesirable levels of sound at different frequency bands. In some examples, the keying features may be designed to correspond to the different noise producing components. For example, a first keying feature may be designed with a POA and/or perforation shape directed to attenuating sound produced in the first frequency band of one noise producing component, e.g., a burner, and a second keying feature may be designed with a different POA and/or perforation shape directed to attenuating sound produced in a second frequency band of another noise producing component, e.g., a combustion air blower. Other keying features may be directed to other noise producing component and/or more keying features may be used.

Figure 3F:
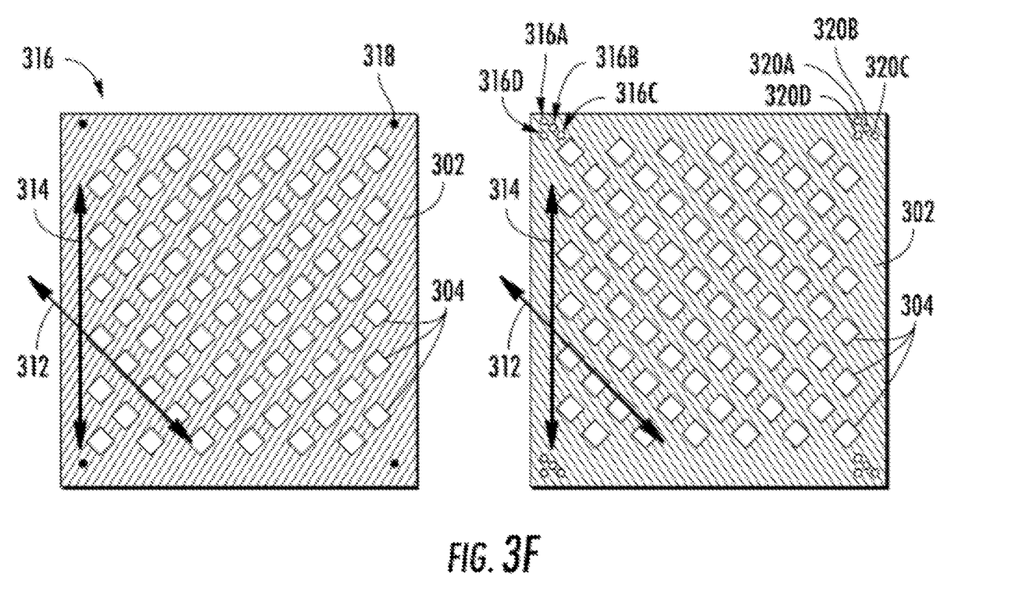
FIG. 3F is an illustration of a perforated layer with keying features, according to an example embodiment of the present disclosure.

FIG. 3F illustrates examples of keying features. In this example, the keying features 316 include a pin and hole connection that will position the sheets in each arrangement. For example, one of the sheets includes a pin connection 318 and the other sheet includes an alignment hole 320. Thus, the keying feature is the connection between both the pin connection and a given alignment hole. By connecting the pin connection to the corresponding alignment hole the keying feature may align the sheets. Other types of keying features may be used (e.g. other shapes like polygons, protrusions, or interlocking shapes and features).

As shown in this example, there are multiple keying features 316 shown as 316A, 316B, 316C, and 316D. In this example, the multiple different keying features correspond to different alignment holes 320 (A-D), and the keying feature 316 is based on which alignment hole the pin connection 318 is connected to. In some examples, the keying features shown as 316A correspond to aligning the sheets 302 in the configuration shown in FIG. 3B. For example, in this example, these keying features align the sheets such that the openings in the two sheets substantial overlap to from evenly distributed diamond shaped openings, potentially the configuration shown in FIG. 3B. Keying features 316B and 316C are located along the parallel axis 312 to move the sheets along this axis and adjust the perforations accordingly. These keying features may correspond to the sheet configuration shown in FIGS. 3C and 3D, respectively. Keying feature 316D is located along the vertical axis 314 and may align the sheets in the manner shown in FIG. 3E. Other configurations for keying features may also be used.

In some examples, a tuning feature is also included on one or more perforated sheets. The tuning feature(s) may be used to adjust the POA of the layer by adjusting the two or more sheets of each layer relative to one another. This adjustment may adjust the plurality of openings in the two or more sheets to a desired configuration of the plurality of perforations in the given perforated layer. As a result, the tuning feature may provide a similar functionality as multiple, continuous keying features, and it may be used to adjust the POA and/or opening shape in a desired manner. For example, the tuning feature may be used once a given noise producing component is selected to be within a given housing. In some examples, the tuning feature is used after one or more noise producing components is included and the tuning feature allows the POA and/or perforation shapes to be adjusted to perform better at attenuating sound from the installed noise producing component.

Figure 3G:
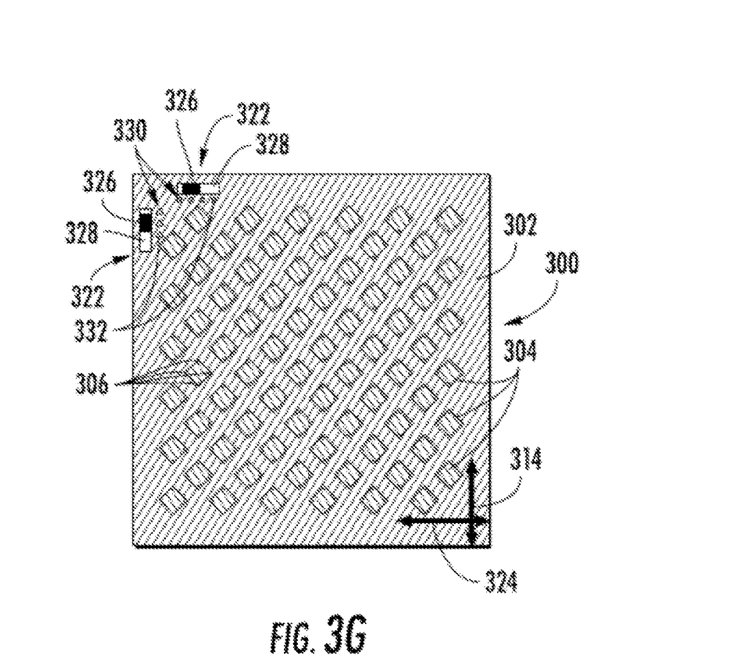
FIG. 3G is an illustration of a perforated layer with tuning features, according to an example embodiment of the present disclosure.

FIG. 3G shows an illustration of a perforated layer 300 with two tuning features 322. In this depicted example, one of the tuning features allows the sheets to adjust relative to the vertical axis 314 and the other tuning feature allows the sheets to adjust relative to the horizontal axis 324. In some examples, both of these tuning features may be adjusted to move the sheets along a different axis, e.g., the shape length axis 312 or another axis. Further, in this example a slide 326 and a guiderail 328 are used as the mechanism for both tuning features, however, other mechanism may also be used. For example, a lever may be used to slide one sheet along a specific axis, while leaving the other sheet in a fixed position, tuning the application by varying the POA. Similarly, mechanically adjusting the overlap of the sheets by aligning and pinning other keyed features on the sheets could be done to tune the application by shifting to set POA values.

The example depicted in FIG. 3G also includes visual indicators 330 with markings 332 located next to the tuning features 322. Each marking may correspond to a desired positioning of the two or more sheets 302 in a perforated layer 300. This desired position may arrange the plurality of openings 304 in the two or more sheets to create the desired configuration of perforations 306 with a desired POA. The desired POA may correspond to a frequency band of sound that may be produced by the noise producing component. In some examples, the markings provide an indication of the POA, frequency band, and/or noise producing component the marking is directed to. In some examples, the markings correspond to a position for two or more tuning features to allow the sheets to move relative to a different axis.

Using the various features and configurations discussed above, various acoustic metamaterial stacks may be utilized. For example, as discussed above, in some examples, a double stack configuration (e.g., the examples shown in FIGS. 2A and 2B) is utilized. In some of these examples, the third perforated layer may also be included, and the third perforated layer may also use two or more sheets in a similar manner discussed above. For example, the two or more sheets may all include a plurality of openings, and the two or more sheets may be arranged such that the plurality of openings in the two or more sheets for the third perforated layer are aligned to create the plurality of perforations in the third perforated layer. In some of these examples, the POA in the first two perforated layers is the same, and the POA in the third perforated layer is different. In some of these examples, the first two perforated layers are directed to attenuating sound from a first noise producing component, and the third perforated layer is directed to attenuating sound from a second, different noise producing component. More stacks and/or perforated layers may also use as well as different configurations.

Figure 4:
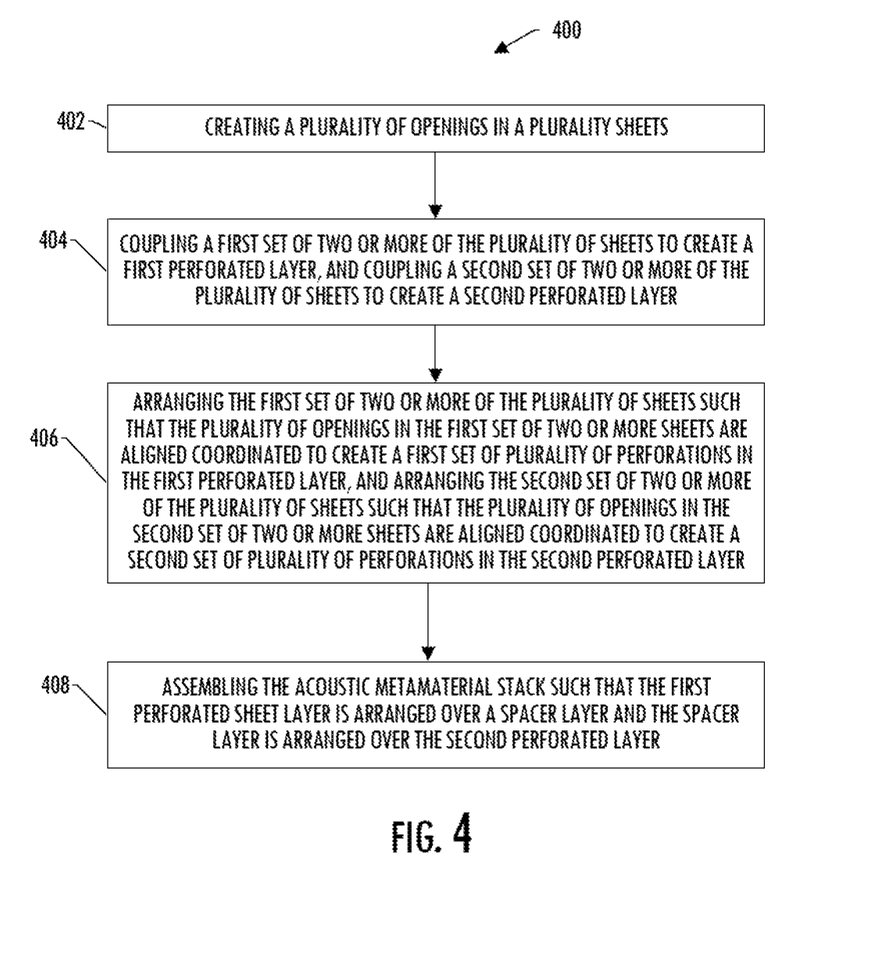
FIG. 4 is an example method, according to an example embodiment of the present disclosure.

Various method may be used to manufacture an acoustic metamaterial stack as described herein. For example, FIG. 4 shows an example process 400 that may be used. This process may include creating a plurality of openings in a plurality of sheets, as shown in step 402. The process may also include coupling a first set of two or more of the plurality of sheets to create a first perforated layer, and potentially coupling a second set of two or more of the plurality of sheets to create a second perforated layer, as shown in step 404. The process may further include arranging the first set of two or more of the plurality of sheets such that the plurality of openings in the first set of two or more sheets are coordinated to create a first set of plurality of perforations in the first perforated layer, as shown in step 406. This step 406 may also include arranging the second set of two or more of the plurality of sheets such that the plurality of openings in the second set of two or more sheets are coordinated to create a second set of plurality of perforations in the second perforated layer. In these examples, the first set of the plurality of perforations may create a first percentage of open area (POA) in the first perforated sheet and the second set of the plurality of perforations may create a second percentage of open area (POA) in the second perforated sheet. The process may also include assembling the acoustic metamaterial stack such that the first perforated layer is arranged over a spacer layer and the spacer layer is arranged over the second perforated layer, as shown in step 406.

To walk through these steps further, the plurality of openings may be created in a variety of different ways at step 402. For example, a punching operation may be used to create the plurality of openings. In these examples, the punching operation may include a die with an opening pattern. This may be advantageous to create a set and consistent opening pattern, such as the opening patterns discussed above. Further, in some examples, a single die is used to create two different opening patterns in the sheets. For example, the opening pattern for a given sheet may be the mirror image of the opening pattern for a separate sheet. As a result, the same die may be used, and the sheets are flipped to create different opening patterns. In other examples, multiple different dies may be used, and the patterns may change. This process may have various advantages. For example, the small perforations may require complex manufacturing techniques or tools, e.g., laser cutting, etc. However, by utilizing relatively large openings in two or more sheets then more common (and readily accessible) techniques such as punching operations may be utilized. Further by arranging these larger openings in different sheets to form smaller perforations, the same or similar perforations may be created. Further, the resulting perforated layer may provide the same or similar performance to the perforated layers created by the more expensive and complex processes. Thus, this technique may allow for substantial cost savings, manufacturing efficiencies, and/or other advantages. Other manufacturing methods that could be used to perforate these sheets includes water jet cutting or pushing through a hot roller (with heat points/tips to create holes). These sheets could also be created through molding processes (e.g. injection molding, thermoforming, extrusion, etc) where the material flows around die features in a mold, generating a molded part where no additional manufacturing operations are required to create perforations.

Further, multiple processes may be used to couple the set(s) of sheets at step 404. Indeed, any coupling process may be used, and typically the coupling process will be designed to secure the sheets in the appropriate position such that the openings create the desired perforations. Or if a tuning feature is including, the coupling process may allow the sheets to adjust relative to each other to adjust the openings in a given sheet relative to the openings in another sheet. This adjustment may allow for adjustments in the perforations created by these openings in the manner discussed above. In some examples, clips may be used to couple these sheets, or other mechanisms, e.g., adhesive, brazing, push pin connection, pin welding, crimping, mechanical fasteners, heat staking, ultrasonic welding, etc. Indeed, any coupling mechanism may be used.

In addition, various methods may be used to arrange the set(s) of sheets at step 406. In some examples, keying features are used to arrange the set(s) of sheets. As discussed above, these keying features may selectively position a given set of sheets to create a desired configuration for the plurality of perforations for a given perforated layer. In some examples, multiple keying features may be included. In these examples, each keying features may selectively position the sheets in a given set such that the plurality of openings in the sheets within the set create a different desired configuration for the plurality of perforations. In these examples, the process 400 may include selecting the appropriate keying feature that selectively positions the sheets to create a desired configuration for the plurality of perforations in the given perforated layer. In some examples, this selection is based on the noise producing component that may be associated with the perforated layer being arranged. In some examples, the selection is based on the underlying equipment being manufactured, e.g., an air handler unit, a furnace, a chiller, etc. In these examples, the keying feature may be directed to attenuating noise from noise producing components typically associated with the underlying equipment.

In some examples, an adjustable tuning feature may be coupled to one or more of the sets of sheets being arranged. In these examples, the set(s) of sheets may be arranged by adjusting the adjustable tuning feature to arrange the sheets within the set. This may be done to arrange the sheets in a given perforated layer relative to one another such that the plurality of openings in the sheets are adjusted to the desired configuration of plurality of perforations in that given perforated layer. In some examples, similar to the keying features discussed above, the adjustable tuning feature is adjusted and set after it is determined what noise producing components will be attenuated by the acoustic metamaterial stack. Further, in some examples, this adjustment is made after the noise producing component is operating and the tuning feature is used to empirically adjust and test the different configurations. In these examples, the tuning feature may then arrange the sheets in the location that provides the best noise attenuation based on these adjustments and testing. Thus, similar to the above, this adjustment may be made to arrange the sheets in a desired configuration to attenuate noise from the relevant noise producing component(s) by setting a given POA and/or perforation shape for the plurality of perforations.

Further, the process may include assembling the acoustic metamaterial stack at step 408. At this step, a perforated layer, potentially a first perforated layer, may be arranged over a spacer layer, and the spacer layer may be arranged over another perforated layer, potentially a second perforated layer. Any method may be used for this assembling, and in some examples, the various layers are attached to ensure the layers of the acoustic metamaterial stack are arranged in a consistent position relative to each other.

In some examples, the method includes manufacturing a multi-stacked acoustic metamaterial stack. For example, a double stack structure (e.g., FIGS. 2A and 2B) is formed. In these examples, the process may include coupling a third set of two or more of the plurality of sheets to create a third perforated layer in the manner discussed above at step 404. In these examples, the process may also include arranging the third set of two or more of the sheets in the manner discussed above at step 406. In these examples, the sheets may be arranged such that the plurality of openings in the third set of sheets are coordinated to create a third set of plurality of perforations in the third perforated layer. Further, in these examples, a second spacer layer is arranged over the first acoustic metamaterial stack, and the third perforated layer is arranged over the second spacer layer in the manner discussed above at step 408. In some examples, more stacks are created.

In some examples, the perforated layers in the acoustic metamaterial stack are arranged such that one or more of the performed layers have a different POA. For example, in a single stack configuration, the first perforated layer may have a first POA and the second perforated layer may have a second POA. In these examples the first and the second POA may be different. In other examples, in a double stack (or more) configuration, the third perforated layer may have a third POA, and in some examples, the third POA may be different from the first and/or second POAs. In some examples, each POA configuration corresponds to a noise producing component. Other configurations and designs may also be utilized.

In some examples, the process includes additional steps. For example, the acoustic metamaterial stack may be coupled to and/or arranged in a housing or other surface as discussed above.

As explained above and reiterated below, the present disclosure includes, without limitation, the following example implementations.

Clause 1. A low noise climate control device comprising: a housing; a noise producing component within the housing; and an acoustic metamaterial stack arranged in the housing, the acoustic metamaterial stack including a first perforated layer arranged over a spacer layer, the spacer layer arranged over a second perforated layer, and the first and second perforated layers each including a plurality of perforations creating a percentage of open area (POA) in each of the first and second perforated layers, wherein the first and second perforated layers each further include two or more sheets, each sheet including a plurality of openings, wherein the two or more sheets for each perforated layer are arranged such that the plurality of openings in the two or more sheets for each perforated layer coordinate to create the plurality of perforations in each of the perforated layers.

Clause 2. The low noise climate control device in any of the clauses, wherein the plurality of openings in the two or more sheets of at least one of the first and second perforated layers are arranged in an opening pattern, the opening pattern including a certain shape for the plurality of openings and a certain spacing between the plurality of openings.

Clause 3. The low noise climate control device in any of the clauses, wherein the certain shape is a diamond shape.

Clause 4. The low noise climate control device in any of the clauses, wherein the certain shape includes a shape length and the certain spacing includes a spacing length, wherein the spacing length is less than the shape length.

Clause 5. The low noise climate control device in any of the clauses, wherein the shape length is about 5 mm and the spacing length is about 4.25 mm.

Clause 6. The low noise climate control device in any of the clauses, wherein at least one of the first and second perforated layers include at least one keying feature, the keying feature positioning the two or more sheets in the at least one of the first and second perforated layers such that the plurality of openings in the two or more sheets create a desired configuration for the plurality of perforations in the at least one of the first and second perforated layers.

Clause 7. The low noise climate control device in any of the clauses, wherein the at least one keying feature includes a plurality of keying features, wherein each of the plurality of keying features selectively positions the two or more sheets such that the plurality of openings in the two or more sheets create a different desired configuration for the plurality of perforations.

Clause 8. The low noise climate control device in any of the clauses, wherein the noise producing component produces a sound within one of two frequency bands, wherein each of the different desired configurations for the plurality of perforations correspond to a different desired POA, wherein at least one of the desired POAs corresponds to one of the two frequency bands and at least one other of the desired POAs corresponds to the other of the two frequency bands.

Clause 9. The low noise climate control device in any of the clauses, wherein the noise producing component is one of either a burner or a blower.

Clause 10. The low noise climate control device in any of the clauses, wherein at least one of the first and second perforated layers comprises a tuning feature configured to adjust the POA of the layer by adjusting the two or more sheets of each layer relative to one another such that the plurality of openings in the two or more sheets adjust the desired configuration of the plurality of perforations in the at least one of the first and second perforated layers.

Clause 11. The low noise climate control device in any of the clauses, wherein the tuning feature is one of either a lever or a guiderail.

Clause 12. The low noise climate control device in any of the clauses, wherein the tuning feature further includes a plurality of markings, each marking corresponding to a desired positioning of the two or more sheets in the at least one of the first and second perforated layers such that the plurality of openings in the two or more sheets create the desired configuration with a desired POA, the desired POA corresponding to a frequency band of sound that may be produced by the noise producing component.

Clause 13. The low noise climate control device in any of the clauses, wherein the POA is less than 5% in at least one of the first and second perforated layers.

Clause 14. The low noise climate control device in any of the clauses, wherein the POA is less than 2% in at least one of the first and second perforated layers.

Clause 15. The low noise climate control device in any of the clauses, wherein at least one of the first and second perforated layers include three or more sheets, each sheet including a plurality of openings, wherein the three or more sheets are arranged such that the plurality of openings in the three or more sheets for each perforated layer are aligned to create the plurality of perforations in least one of the first and second perforated layers.

Clause 16. The low noise climate control device in any of the clauses, wherein at least one of the first and second perforated layers has a thickness that is equal to or less than 0.25 mm.

Clause 17. The low noise climate control device in any of the clauses, wherein the acoustic metamaterial stack further includes a second spacer layer and a third perforated layer, the second spacer layer arranged over the second perforated layer and the third perforated layer arranged over the second spacer layer, and the third perforated layer including a plurality of perforations creating a POA in the third perforated layer, wherein the third perforated layer further include two or more sheets, each sheet including a plurality of openings, wherein the two or more sheets for the third perforated layer are arranged such that the plurality of openings in the two or more sheets for third perforated layer are aligned to create the plurality of perforations in the third perforated layer.

Clause 18. The low noise climate control device in any of the clauses, wherein the POA in the third perforated layer is different than the POA in the first and second perforated layer.

Clause 19. The low noise climate control device in any of the clauses, wherein the acoustic metamaterial stack has a thickness that is equal to or less than 50.8 mm.

Clause 20. The low noise climate control device in any of the clauses, wherein the first perforated layer comprise a plastic material, and the second perforated layer comprises a metal sheet.

Clause 21. A method of manufacturing an acoustic metamaterial stack, the method comprising: creating a plurality of openings in a plurality sheets; coupling a first set of two or more of the plurality of sheets to create a first perforated layer, and coupling a second set of two or more of the plurality of sheets to create a second perforated layer; arranging the first set of two or more of the plurality of sheets such that the plurality of openings in the first set of two or more sheets are coordinated to create a first set of plurality of perforations in the first perforated layer, and arranging the second set of two or more of the plurality of sheets such that the plurality of openings in the second set of two or more sheets are coordinated to create a second set of plurality of perforations in the second perforated layer, wherein the first set of the plurality of perforations create a first percentage of open area (POA) in the first perforated sheet and the second set of the plurality of perforations create a second percentage of open area (POA) in the second perforated sheet; and assembling the acoustic metamaterial stack such that the first perforated layer is arranged over a spacer layer and the spacer layer is arranged over the second perforated layer.

Clause 22. The method in any of the clauses, wherein creating the plurality of openings in the plurality of sheets includes using a punching operation.

Clause 23. The method in any of the clauses, wherein the punching operation includes using a die with an opening pattern, the opening pattern including a certain shape for the plurality of openings and a certain spacing between the plurality of opening.

Clause 24. The method in any of the clauses, wherein the die is a single die used to create a single opening pattern in the plurality of sheets.

Clause 25. The method in any of the clauses, wherein the arranging further includes using an keying feature to selectively position at least one of the first set of two or more of the plurality of sheets and the second set of two or more of the plurality of sheets to create a desired configuration for the plurality of perforations in the at least one of the first and second perforated layers.

Clause 26. The method in any of the clauses, wherein the arranging further includes selecting a keying feature from a plurality of keying features and using the keying feature to selectively position at least one of the first set of two or more of the plurality of sheets and the second set of two or more of the plurality of sheets to create a desired configuration for the plurality of perforations in the at least one of the first and second perforated layers, each of the plurality of keying features selectively positioning the two or more sheets such that the plurality of openings in the two or more sheets create a different desired configuration for the plurality of perforations in the at least one of the first and second perforated layers.

Clause 27. The method in any of the clauses, wherein the coupling further includes using an adjustable tuning feature to couple at least one of the first set of two or more of the plurality of sheets and the second set of two or more of the plurality of sheets, the adjustable tuning feature including a guiderail and a slide, the slide and guiderail configured to adjust the POA of the layer by adjusting the two or more sheets of each layer relative to one another such that the plurality of openings in the two or more sheets adjust the desired configuration for the of plurality of perforations in the at least one of the first and second perforated layers.

Clause 28. The method in any of the clauses, further comprising: coupling a third set of two or more of the plurality of sheets to create a third perforated layer; and arranging the third set of two or more of the plurality of sheets such that the plurality of openings in the third set of two or more sheets are coordinated to create a third set of plurality of perforations in the third perforated layer, the third set of the plurality of perforations creating a third percentage of open area (POA) in the third perforated sheet, and wherein the assembling the acoustic metamaterial layer further includes arranging a second spacer layer over the second perforated layer and the third perforated layer over the second spacer layer.

Clause 29. The method in any of the clauses, wherein the POA in the third perforated layer is different than the POA in the first and second perforated layer.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A low noise climate control device comprising:
a housing;
a noise producing component within the housing; and
an acoustic metamaterial stack arranged in the housing, the acoustic metamaterial stack including:
a first perforated layer arranged over a spacer layer, the spacer layer arranged over a second perforated layer, and
the first and second perforated layers each including a plurality of perforations creating a percentage of open area (POA) in each of the first and second perforated layers,
wherein the first and second perforated layers each further include two or more sheets, each sheet including a plurality of openings,
wherein the two or more sheets for each perforated layer are arranged such that the plurality of openings in the two or more sheets for each perforated layer coordinate to create the plurality of perforations in each of the perforated layers.

2. The low noise climate control device of claim 1, wherein the POA is less than 5% in at least one of the first and second perforated layers.

3. The low noise climate control device of claim 1, wherein the POA is less than 2% in at least one of the first and second perforated layers.

4. The low noise climate control device of claim 1, wherein at least one of the first and second perforated layers include three or more sheets, each sheet including a plurality of openings,
wherein the three or more sheets are arranged such that the plurality of openings in the three or more sheets for each perforated layer are aligned to create the plurality of perforations in least one of the first and second perforated layers.

5. The low noise climate control device of claim 1, wherein at least one of the first and second perforated layers has a thickness that is equal to or less than 0.25 mm.

6. The low noise climate control device of claim 1, wherein the acoustic metamaterial stack has a thickness that is equal to or less than 50.8 mm.

7. The low noise climate control device of claim 1, wherein the first perforated layer comprise a plastic material, and the second perforated layer comprises a metal sheet.

8. The low noise climate control device of claim 1, wherein the acoustic metamaterial stack further includes a second spacer layer and a third perforated layer, the second spacer layer arranged over the second perforated layer and the third perforated layer arranged over the second spacer layer, and the third perforated layer including a plurality of perforations creating a POA in the third perforated layer,
wherein the third perforated layer further include two or more sheets, each sheet including a plurality of openings, wherein the two or more sheets for the third perforated layer are arranged such that the plurality of openings in the two or more sheets for third perforated layer are aligned to create the plurality of perforations in the third perforated layer.

9. The low noise climate control device of claim 8, wherein the POA in the third perforated layer is different than the POA in the first and second perforated layer.

10. The low noise climate control device of claim 1, wherein at least one of the first and second perforated layers comprises a tuning feature configured to adjust the POA of the layer by adjusting the two or more sheets of each layer relative to one another such that the plurality of openings in the two or more sheets adjust the desired configuration of the plurality of perforations in the at least one of the first and second perforated layers.

11. The low noise climate control device of claim 10, wherein the tuning feature is one of either a lever or a guiderail.

12. The low noise climate control device of claim 10, wherein the tuning feature further includes a plurality of markings, each marking corresponding to a desired positioning of the two or more sheets in the at least one of the first and second perforated layers such that the plurality of openings in the two or more sheets create the desired configuration with a desired POA, the desired POA corresponding to a frequency band of sound that may be produced by the noise producing component.

13. The low noise climate control device of claim 1, wherein the plurality of openings in the two or more sheets of at least one of the first and second perforated layers are arranged in an opening pattern, the opening pattern including a certain shape for the plurality of openings and a certain spacing between the plurality of openings.

14. The low noise climate control device of claim 13, wherein the certain shape is a diamond shape.

15. The low noise climate control device of claim 13, wherein the certain shape includes a shape length and the certain spacing includes a spacing length, wherein the spacing length is less than the shape length.

16. The low noise climate control device of claim 15, wherein the shape length is about 5 mm and the spacing length is about 4.25 mm.

17. The low noise climate control device of claim 1, wherein at least one of the first and second perforated layers include at least one keying feature,
the keying feature positioning the two or more sheets in the at least one of the first and second perforated layers such that the plurality of openings in the two or more sheets create a desired configuration for the plurality of perforations in the at least one of the first and second perforated layers.

18. The low noise climate control device of claim 17, wherein the at least one keying feature includes a plurality of keying features,
wherein each of the plurality of keying features selectively positions the two or more sheets such that the plurality of openings in the two or more sheets create a different desired configuration for the plurality of perforations.

19. The low noise climate control device of claim 18, wherein the noise producing component produces a sound within one of two frequency bands,
wherein each of the different desired configurations for the plurality of perforations correspond to a different desired POA, wherein at least one of the desired POAs corresponds to one of the two frequency bands and at least one other of the desired POAs corresponds to the other of the two frequency bands.

20. The low noise climate control device of claim 19, wherein the noise producing component is one of either a burner or a blower.

* * * * *